United States Patent
Lin et al.

(10) Patent No.: US 10,020,745 B2
(45) Date of Patent: Jul. 10, 2018

(54) PWM CONTROLLER WITH PROGRAMMABLE SWITCHING FREQUENCY FOR PSR/SSR FLYBACK CONVERTER

(71) Applicant: INNO-TECH CO., LTD., Taipei (TW)

(72) Inventors: Ching-Yuan Lin, Taipei (TW); Shu-Chia Lin, Taipei (TW); Wen-Yueh Hsieh, Taipei (TW); Chih Feng Lin, Taipei (TW)

(73) Assignee: INNO-TECH CO., LTD., Taipei (TW)

( * ) Notice: Subject to any disclaimer, the term of this patent is extended or adjusted under 35 U.S.C. 154(b) by 6 days.

(21) Appl. No.: 15/224,539

(22) Filed: Jul. 30, 2016

(65) Prior Publication Data

US 2018/0034378 A1    Feb. 1, 2018

(51) Int. Cl.
*H02M 3/335*    (2006.01)
*H02M 1/08*    (2006.01)
*H02M 1/00*    (2006.01)

(52) U.S. Cl.
CPC ......... *H02M 3/33523* (2013.01); *H02M 1/08* (2013.01); *H02M 2001/0009* (2013.01)

(58) Field of Classification Search
None
See application file for complete search history.

(56) References Cited

U.S. PATENT DOCUMENTS

| | | | |
|---|---|---|---|
| 9,762,132 B2 * | 9/2017 | Freeman | H02M 3/33546 |
| 2013/0301302 A1 * | 11/2013 | Wu | H02M 3/325 363/15 |
| 2015/0295496 A1 * | 10/2015 | Chen | H02M 1/32 363/21.18 |
| 2016/0087542 A1 * | 3/2016 | Warnes | H02M 1/32 363/21.05 |
| 2017/0005583 A1 * | 1/2017 | Choi | H02M 3/33553 |

* cited by examiner

*Primary Examiner* — Jeffrey Gblende
(74) *Attorney, Agent, or Firm* — Lin & Associates Intellectual Property, Inc.

(57) ABSTRACT

Disclosed is a PWM controller with programmable switching frequency for PSR/SSR flyback converter so as to maximize the performance-to-cost ratio by tailor-making the switching frequency as a non-decreasing function of the output load and the maximum switching frequency as a non-increasing function of the input voltage, leading to a plurality of programmable voltage-dependent frequency-load curves, making possible the downsizing of flyback transformer while facilitating the simultaneous compliance with DoE and CoC efficiency requirements.

8 Claims, 4 Drawing Sheets

PWM CONTROLLER WITH PROGRAMMABLE SWITCHING FREQUENCY FOR PSR/SSR FLYBACK CONVERTER

BACKGROUND OF THE INVENTION

1. Field of the Invention

The present invention relates to a Pulse Width Modulation (PWM) controller, and more specifically to a PWM controller with programmable switching frequency for Primary-Side Regulation (PSR)/Secondary-Side Regulation (SSR) flyback converter so as to maximize the performance-to-cost ratio by tailor-making the switching frequency as a non-decreasing function of the output load and the maximum switching frequency as a non-increasing function of the input voltage, leading to a plurality of programmable voltage-dependent frequency-load curves, making possible the downsizing of flyback transformer while facilitating the simultaneous compliance with DoE and CoC efficiency requirements.

2. The Prior Arts

Various electric/electronic devices operate off of a specific operating voltage. For example, Integrated Circuits (ICs) are generally supplied with 5, 3, or 1.8 Vdc, some DC motors need 12 Vdc, and high-power devices require 110 or 220 Vac. In particular, the lamp of the LED display usually operates off of a much higher operating voltage. Thus, many kinds of power converters or inverters have been developed to meet those various demands.

Flyback converter, which has the advantage of simpler architecture and wider operating voltage range, is one of the most widely used switching power converters. As a result, flyback converter is almost omnipresent/ubiquitous in electronic devices consuming low to medium power. More specifically, flyback converter leverages switching components to manipulate the energy, stored to and released from a coupled inductor (also called a flyback transformer by the industry) based on the volt-second balance principle, so as to deliver the required output power. At the same time, passive Resistor-Capacitor-Diode (RCD) dampers and Resistor-Capacitor (RC) snubbers are used to suppress the voltage stress on the switching components by means of absorbing voltage spikes resulting from the leakage inductance of the flyback transformer.

In prior arts, a flyback converter normally has its output voltage regulated either by Secondary-Side Regulation (SSR) or by Primary-Side Regulation (PSR). SSR regulates the output voltage by means of optical coupling from the secondary side, requiring an optocoupler-based feedback control circuit in the secondary side while having the advantage of a tighter output voltage regulation. PSR regulates the output voltage by means of magnetic coupling to the primary side, requiring no optocoupler-based feedback control circuit in the secondary side while having the disadvantage of a looser output voltage regulation.

With the rise of awareness of energy conservation and environmental protection, the no-load power consumption, measured as the AC power input at no load, and the 4-point average efficiency, averaged over 25%, 50%, 75%, and 100% of full load, of eligible power adapters must be certified to be in compliance with Department of Energy (DoE) or Code of Conduct (CoC) efficiency standards.

In an attempt to improve the 4-point average efficiency by reducing the switching loss, traditional PWM controllers for PSR/SSR flyback converter only reduce the switching frequency in view of a decreased output load status and haven't keep an eye on the status of the input voltage yet, unable to meet DoE (stipulating efficiency standards at the 115 Vac low line) and CoC (stipulating efficiency standards at the 230 Vac high line) requirements at the same time.

In order to get the best of both worlds, the inventors comes up with a PWM controller with programmable switching frequency for PSR/SSR flyback converter to maximize the performance-to-cost ratio by means of taking both the output load and the input voltage into account/consideration, i.e., by tailor-making the switching frequency as a non-decreasing function of the output load and the maximum switching frequency as a non-increasing function of the input voltage so that the flyback transformer can possibly be downsized to save cost and space and the 4-point average efficiency can meet or exceed DoE and CoC standards.

SUMMARY OF THE INVENTION

The primary objective of the present invention is to create a PWM controller with programmable switching frequency for PSR/SSR flyback converter, able to kill two birds with one stone, i.e. having both DoE and CoC efficiency certification in the bag while standing a good chance of downsizing the flyback transformer so that the performance-to-cost ratio can get to the top. The disclosed PWM controller with programmable switching frequency, having at least six pins including a VCC (supply voltage input) pin, a GND (reference ground) pin, a GATE (gate drive output) pin, an AUX (auxiliary input) pin, a CS (current-sensing) pin, and a COMP (compensation) pin, in collocation with an AC-to-DC rectification unit, an input capacitor, a flyback transformer, a switching unit, a current-sensing resistor, an output rectifier, an output capacitor (and an SSR unit, absent/present in case of PSR/SSR flyback) forms a PSR/SSR flyback converter.

The flyback transformer consists of a primary winding, a secondary winding, and an auxiliary winding. The primary winding is connected in series with the input capacitor, the switching unit, and the current-sensing resistor to form an energy-storing power loop in the primary side. The secondary winding is connected in series with the output rectifier and the output capacitor to form an energy-releasing power loop in the secondary side. The auxiliary winding, connected to the AUX pin through a voltage divider and the VCC pin through a VCC diode, wears two hats. The auxiliary winding can sense the input voltage Vi when the switching unit switches on to store energy and the output voltage Vo when the output rectifier turns on to release energy. The AUX pin would be internally clamped at a slightly positive potential Vclamp (0.15 Vdc typical) to provide an effective and efficient means of sensing the input voltage Vi through the auxiliary winding when the switching unit switches on to store energy and the auxiliary winding induces a negative voltage, $$-\frac{V_i N_a}{N_p}.$$

More specifically, a current, $$I_{aux} = \frac{V_{clamp} - \left(-\frac{V_i N_a}{N_p}\right)}{R_1} + \frac{V_{clamp} - 0}{R_2} = \frac{V_{clamp} + \frac{V_i N_a}{N_p}}{R_1} + \frac{V_{clamp}}{R_2},$$

flowing out of the AUX pin of the PWM controller, would be in proportion to the input voltage Vi during the on time of the switching unit, and thus can be used for sensing the input voltage Vi. The AUX pin would get a slice of the reflected output voltage, $$\frac{V_o N_a}{N_s} \times \frac{R_2}{R_1 + R_2},$$

to sense the output voltage Vo through the auxiliary winding when the output rectifier turns on to release energy and the auxiliary winding induces a positive voltage, $$\frac{V_o N_a}{N_s}.$$

In addition to cluing the PWM controller in on the input voltage Vi and the output voltage Vo, the auxiliary winding would also provide the VCC pin with a continuous and steady working voltage supply through a VCC diode after startup.

In case of a PSR flyback converter without a SSR unit, the output voltage Vo is regulated by comparing the AUX pin potential, $$\frac{V_o N_a}{N_s} \times \frac{R_2}{R_1 + R_2},$$

with a reference voltage inside the PWM controller in the primary side when the output rectifier turns on to release energy. The auxiliary winding is connected in series with the voltage divider R1 and R2 to form a voltage-regulating signal loop for the output voltage Vo when the output rectifier turns on to release energy. In case of a SSR flyback converter with a SSR unit, the output voltage Vo is regulated by comparing a scaled-down output voltage, $$\frac{V_o R_{52}}{R_{51} + R_{52}},$$

with a reference voltage inside the shunt regulator in the secondary side. The shunt regulator is connected to the output terminal through a voltage divider R51 and R52 and a current-limiting resistor R53 as well as optocoupled to the COMP pin of the PWM controller to form a voltage-regulating signal loop for the output voltage Vo.

The AC-to-DC rectification unit in collocation with the input capacitor forms a peak-rectifier for the AC mains, which peak-rectifies a universal AC input voltage source Vin (90~264 Vac typical) into an unregulated DC input voltage source Vi (127~373 Vdc typical) as the input voltage to the PSR/SSR flyback converter. The AC-to-DC rectification unit, which is placed between the AC mains and the input capacitor, can be but won't be limited to a diode bridge rectifier or a MOSFET bridge rectifier.

The switching unit, connected in series with the current-sensing resistor, placed at the low side of the primary winding, and driven by the GATE pin of the PWM controller, can be but won't be limited to a power Metal Oxide Semiconductor Field Effect Transistor (MOSFET) or a power Bipolar Junction Transistor (BJT). The GND pin of the PWM controller, which is grounded in the primary side, must be connected/referenced to the source/emitter of the power MOSFET/BJT through the current-sensing resistor in order to low-side drive the switching unit with a source/emitter-referenced PWM signal. The CS pin of the PWM controller, connected to the source/emitter of the power MOSFET/BJT and the high side of the current-sensing resistor, can sense the output current Io as a known function of the primary peak current Ipk, depending on the operating mode of the flyback converter, $$P_o = V_o I_o = \frac{1}{2} L_p I_{pk}^2 f_s \eta \, (DCM) \text{ or}$$

$$P_o = V_o I_o = V_i \left( I_{pk} - \frac{V_i \times \frac{nV_o}{V_i + nV_o}}{2 L_p f_s} \right) \times \frac{nV_o}{V_i + nV_o} \eta \, (CCM),$$

when the switching unit switches on to store energy. So, the AUX pin can sense the input voltage Vi and the CS pin can sense the output current Io when the switching unit switches on to store energy. The COMP pin of the PWM controller, whose voltage level in comparison with the CS pin's voltage level determines the duty ratio/on time of the PWM signal/switching unit, is connected to the ground in the primary side through a compensation capacitor.

The output rectifier in collocation with the output capacitor forms a peak-rectifier for the flyback transformer, which peak-rectifies the alternating secondary winding voltage waveform into a regulated DC output voltage level as the output voltage from the PSR/SSR flyback converter. Furthermore, the output rectifier, which can be placed either at the secondary high side or at the secondary low side, can be but won't be limited to a diode rectifier or a synchronous rectifier.

When it comes to a PSR flyback converter, the PWM controller without the help of the SSR unit would regulate the output voltage Vo within a looser regulation range. When it comes to a SSR flyback converter, the PWM controller in collocation with the SSR unit would regulate the output voltage Vo within a tighter regulation range. The PWM controller would drive the switching unit in response to all the required voltage and current sense signals to keep voltage conversion and power delivery safe and efficient.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
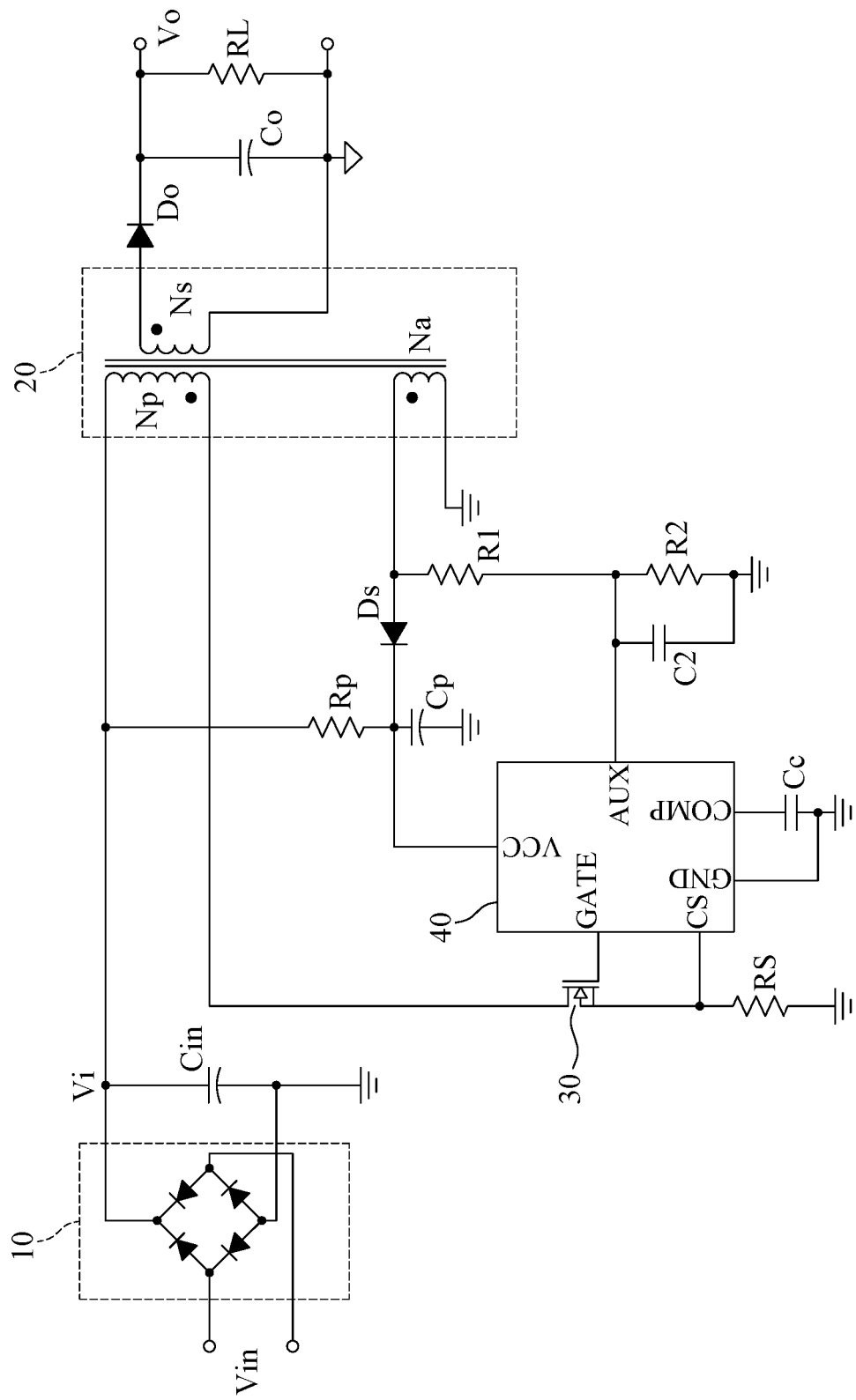
FIG. 1 shows a PSR flyback converter built around the PWM controller with programmable switching frequency in accordance with the first embodiment of the present invention.

Please refer to FIG. 1 for a PSR flyback converter built around the PWM controller 40 with programmable switching frequency in accordance with the first embodiment of the present invention. The disclosed PWM controller 40 with programmable switching frequency, having at least six pins including a VCC (supply voltage input) pin, a GND (reference ground) pin, a GATE (gate drive output) pin, an AUX (auxiliary input) pin, a CS (current-sensing) pin, and a COMP (compensation) pin, in collocation with an AC-to-DC rectification unit 10, an input capacitor Cin, a flyback transformer 20, a switching unit 30, a current-sensing resistor RS, an output rectifier Do, and an output capacitor Co forms a PSR flyback converter.

The flyback transformer 20 consists of a primary winding Np, a secondary winding Ns, and an auxiliary winding Na. The primary winding Np is connected in series with the input capacitor Cin, the switching unit 30, and the current-sensing resistor RS to form an energy-storing power loop in the primary side. The secondary winding Ns is connected in series with the output rectifier Do and the output capacitor Co to form an energy-releasing power loop in the secondary side. The auxiliary winding Na, connected to the AUX pin through a voltage divider R1 and R2 and the VCC pin through a VCC diode Ds, wears two hats. The auxiliary winding Na can sense the input voltage Vi when the switching unit 30 switches on to store energy and the output voltage Vo when the output rectifier Do turns on to release energy. The AUX pin would be internally clamped at a slightly positive potential Vclamp (0.15 Vdc typical) to provide an effective and efficient means of sensing the input voltage Vi through the auxiliary winding Na when the switching unit 30 switches on to store energy and the auxiliary winding Na induces a negative voltage, $$-\frac{V_i N_a}{N_p}.$$

More specifically, a current, $$I_{aux} = \frac{V_{clamp} - \left(-\frac{V_i N_a}{N_p}\right)}{R_1} + \frac{V_{clamp} - 0}{R_2} = \frac{V_{clamp} + \frac{V_i N_a}{N_p}}{R_1} + \frac{V_{clamp}}{R_2},$$

flowing out of the AUX pin of the PWM controller 40, would be in proportion to the input voltage Vi during the on time of the switching unit 30, and thus can be used for sensing the input voltage Vi. The AUX pin would get a slice of the reflected output voltage, $$\frac{V_o N_a}{N_s} \times \frac{R_2}{R_1 + R_2},$$

to sense the output voltage Vo through the auxiliary winding Na when the output rectifier Do turns on to release energy and the auxiliary winding Na induces a positive voltage, $$\frac{V_o N_a}{N_s}.$$

In addition to cluing the PWM controller 40 in on the input voltage Vi and the output voltage Vo, the auxiliary winding Na would also provide the VCC pin with a continuous and steady working voltage supply through a VCC diode Ds after startup.

In case of a PSR flyback converter without a SSR unit, the output voltage Vo is regulated by comparing the AUX pin potential, $$\frac{V_o N_a}{N_s} \times \frac{R_2}{R_1 + R_2},$$

with a reference voltage inside the PWM controller 40 in the primary side when the output rectifier Do turns on to release energy. The auxiliary winding Na is connected in series with the voltage divider R1 and R2 to form a voltage-regulating signal loop for the output voltage Vo when the output rectifier Do turns on to release energy.

The AC-to-DC rectification unit 10 in collocation with the input capacitor Cin forms a peak-rectifier for the AC mains, which peak-rectifies a universal AC input voltage source Vin (90~264 Vac typical) into an unregulated DC input voltage source Vi (127~373 Vdc typical) as the input voltage to the PSR flyback converter. The AC-to-DC rectification unit 10, which is placed between the AC mains and the input capacitor Cin, can be but won't be limited to a diode bridge rectifier or a MOSFET bridge rectifier.

The switching unit 30, connected in series with the current-sensing resistor RS, placed at the low side of the primary winding Np, and driven by the GATE pin of the PWM controller 40, can be but won't be limited to a power Metal Oxide Semiconductor Field Effect Transistor (MOSFET) or a power Bipolar Junction Transistor (BJT). The GND pin of the PWM controller 40, which is grounded in the primary side, must be connected/referenced to the source/emitter of the power MOSFET/BJT through the current-sensing resistor RS in order to low-side drive the switching unit 30 with a source/emitter-referenced PWM signal. The CS pin of the PWM controller 40, connected to the source/emitter of the power MOSFET/BJT and the high side of the current-sensing resistor RS, can sense the output current Io as a known function of the primary peak current Ipk, depending on the operating mode of the flyback converter, $P_o = V_o I_o = 1/2 L_p I_{pk}^2 f_s \eta$ (DCM) or $$P_o = V_o I_o = V_i \left( I_{pk} - \frac{V_i \times \frac{nV_o}{V_i + nV_o}}{2L_p f_s} \right) \times \frac{nV_o}{V_i + nV_o} \eta \, (CCM),$$

when the switching unit 30 switches on to store energy. So, the AUX pin can sense the input voltage Vi and the CS pin can sense the output current Io when the switching unit 30 switches on to store energy. The COMP pin of the PWM controller 40, whose voltage level in comparison with the CS pin's voltage level determines the duty ratio/on time of the PWM signal/switching unit 30, is connected to the ground in the primary side through a compensation capacitor Cc.

The output rectifier Do in collocation with the output capacitor Co forms a peak-rectifier for the flyback transformer 20, which peak-rectifies the alternating secondary winding voltage waveform into a regulated DC output voltage level as the output voltage from the PSR flyback converter. Furthermore, the output rectifier Do, which can be placed either at the secondary high side or at the secondary low side, can be but won't be limited to a diode rectifier or a synchronous rectifier.

When it comes to a PSR flyback converter, the PWM controller 40 without the help of the SSR unit would regulate the output voltage Vo within a looser regulation range. The PWM controller 40 would drive the switching unit 30 in response to all the required voltage and current sense signals to keep voltage conversion and power delivery safe and efficient.

Figure 2:
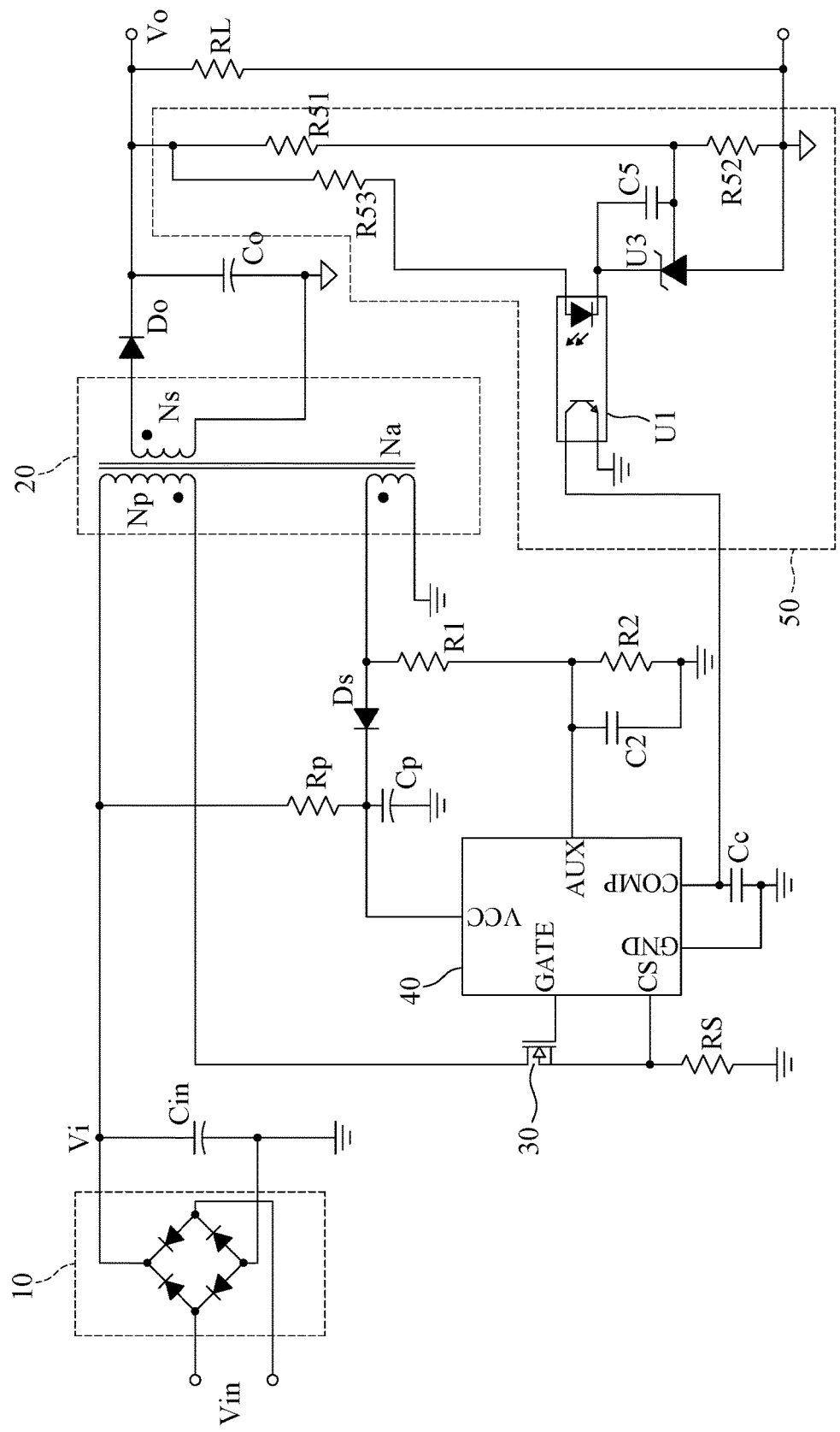
FIG. 2 shows a SSR flyback converter built around the PWM controller with programmable switching frequency in accordance with the second embodiment of the present invention.

Please refer to FIG. 2 for a SSR flyback converter built around the PWM controller 40 with programmable switching frequency in accordance with the second embodiment of the present invention. Since FIG. 2 has a lot in common with FIG. 1 except the SSR unit 50, the following paragraphs would only put a spotlight on the main difference to contrast the second embodiment with the first embodiment.

In case of a SSR flyback converter with the SSR unit 50, the output voltage Vo is regulated by comparing a scaled-down output voltage, $$\frac{V_o R_{52}}{R_{51} + R_{52}},$$

with a reference voltage inside the shunt regulator U3 in the secondary side. The shunt regulator U3 is connected to the output terminal through a voltage divider R51 and R52 and a current-limiting resistor R53 as well as optocoupled to the COMP pin of the PWM controller 40 to form a voltage-regulating signal loop for the output voltage Vo.

When it comes to a SSR flyback converter, the PWM controller 40 in collocation with the SSR unit 50 would regulate the output voltage Vo within a tighter regulation range.

Figure 3:
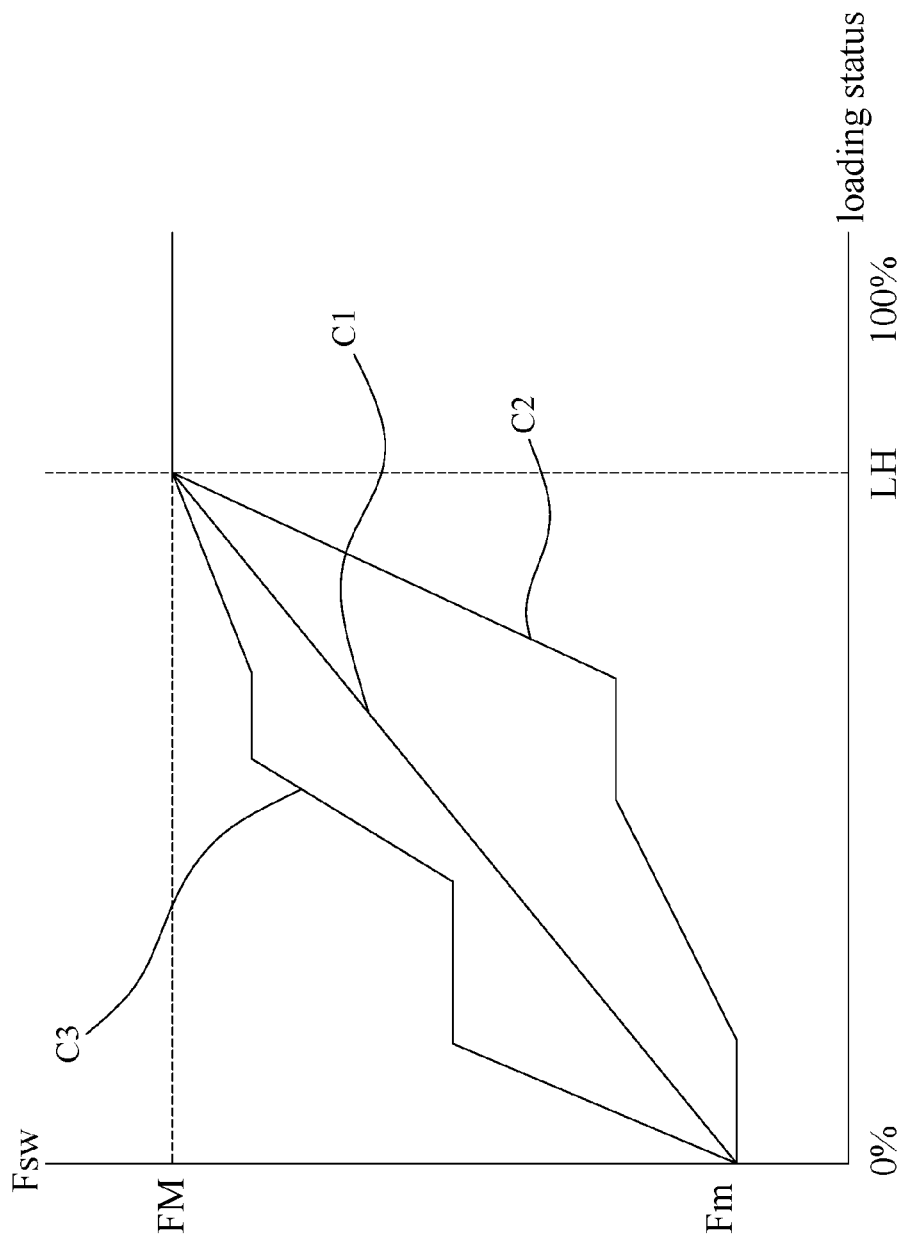
FIG. 3 gives an exemplary sketch relating the switching frequency (Fsw) to the loading status.

Please take a look at FIG. 3, which gives an exemplary sketch relating the switching frequency (Fsw) to the loading status Io, sensed by the CS pin of the PWM controller 40. The loading status refers to the output current (Io=Vo/RL)/output power (Po=Vo$^2$/RL) delivered to the output load RL across the output rail and the switching frequency (Fsw) refers to the Pulse Width Modulation (PWM) frequency applied to the switching unit 30 by the PWM controller 40. 0% loading means no load and 100% loading means full load. A threshold loading LH, partitioning each frequency-load curve into a non-decreasing part and a clamped part, can be cherry-picked from between 70% and 100% loading in consideration of power level, circuit components, and other influential factors of a given PSR/SSR flyback converter so that the performance-to-cost ratio can push the envelope. The minimum switching frequency (Fm) is intended to minimize the no-load power consumption and maximize the little-load conversion efficiency while keeping the audible noise (<=20 KHz) at bay. The maximum switching frequency (FM) is intended to downsize the flyback transformer 20 while giving the excessive switching loss and the regulated Electromagnetic Interference (EMI) (>=150 KHz) a wide berth. When the loading goes below the threshold loading LH, the switching frequency (Fsw), starting from the minimum switching frequency (Fm) at no load and getting to the maximum switching frequency (FM) at the threshold loading LH, goes up or stays level, translating to the non-decreasing part of each frequency-load curve, as is exemplified by the non-decreasing curves C1, C2, and C3. When the loading goes above the threshold loading LH, the switching frequency (Fsw), clamped at the maximum switching frequency (FM) to avoid the excessive switching loss and lessen the regulated EMI, stays level, translating to the clamped part of each frequency-load curve, as is represented by the horizontal line.

Figure 4:
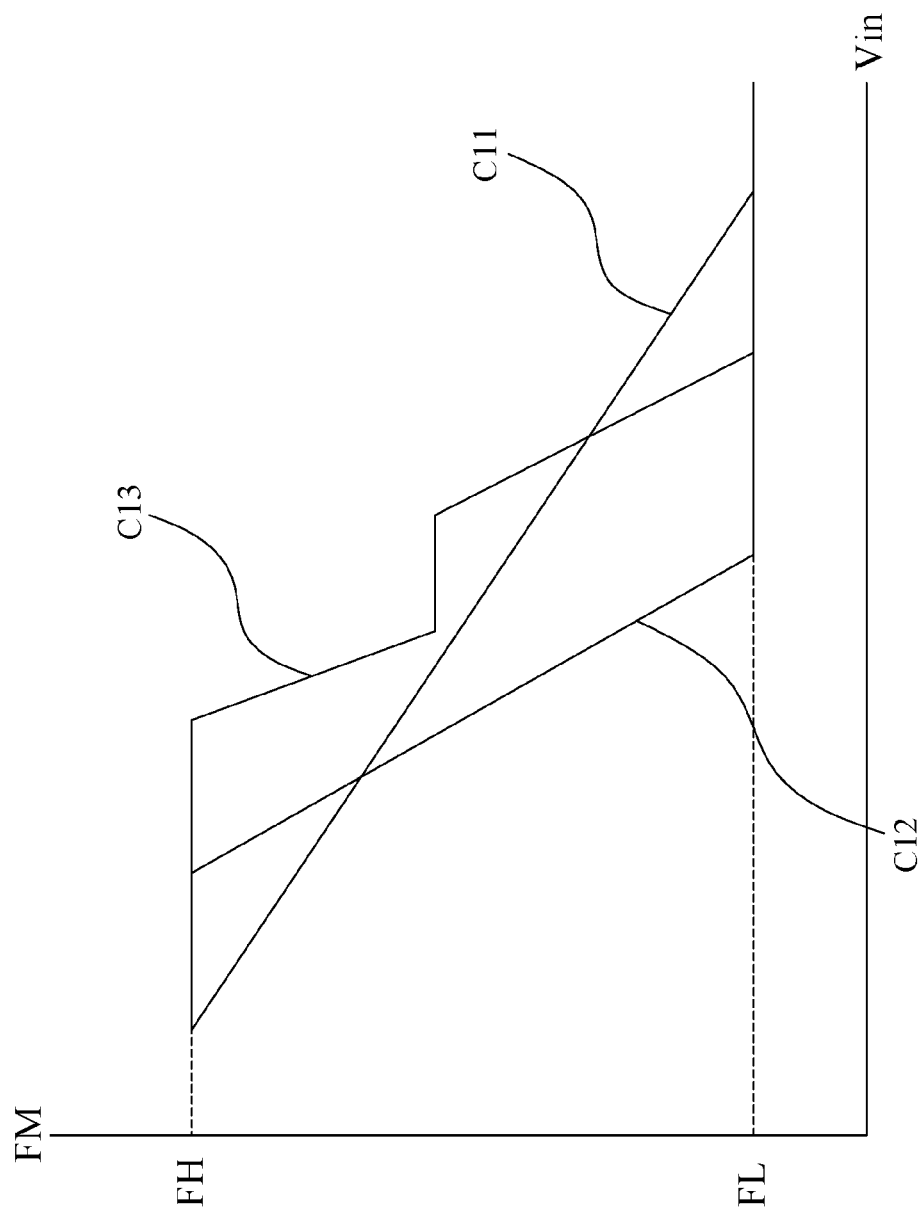
FIG. 4 gives an exemplary sketch relating the maximum switching frequency (FM) to the input voltage.

Please take a look at FIG. 4, which gives an exemplary sketch relating the maximum switching frequency (FM), the clamped part of each frequency-load curve in FIG. 3, to the input voltage Vi, sensed by the AUX pin of the PWM controller 40. The AC input voltage (Vin) refers to the AC mains voltage peak-rectified as a DC input voltage to a PSR/SSR flyback converter and the maximum switching frequency (FM) refers to the clamped switch frequency intended to downsize the flyback transformer 20 without causing the excessive switching loss and worsening the regulated EMI. As a rule of thumb for tailor-making the frequency-voltage curve, the maximum switching frequency (FM), limited in a frequency range between an upper limit (FH) and a lower limit (FL), is allowed to go down or stay level, as is exemplified by the non-increasing curves C11, C12, and C13, because the primary current and the resulting flux density would decrease with an increased input voltage (Vin) when the loading goes above the threshold loading LH. For example, the maximum switching frequency (FM) can probably go down from 150 to 60 KHz in the low-line range of 90 to 132 Vac and from 100 to 50 KHz in the high-line range of 180 to 264 Vac. It goes without saying that all the typical values above are given for concretization of the inventive concept instead of limitation on the present invention.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A flyback convertor for converting a universal AC input voltage source into a regulated DC output voltage source to provide an output voltage, comprising:
   an AC to DC rectification unit coupled with an input capacitor for rectifying an AC universal input voltage source into an unregulated DC input voltage source to provide an input voltage;
   a pulse width modulation (PWM) controller with a programmable switching frequency, having at least a VCC (supply voltage input) pin, a GND (reference ground) pin, a GATE (gate drive output) pin, an AUX (auxiliary input) pin, a CS (current-sensing) pin, and a COMP (compensation) pin; and
   a flyback transformer having:
      a primary winding in a primary side, the primary winding having a first end connected to the input capacitor to receive the input voltage and a second end connected in series with a switching unit and a current sensing resistor, the GATE pin driving the switching unit with a referenced PWM signal, the CS pin being connected to the current sensing resistor and the COMP pin being connected to ground through a compensation capacitor;

a secondary winding in a secondary side, the secondary winding having a first end connected to an output rectifier which outputs an output voltage, an output capacitor being connected between the output rectifier and a second end of the secondary winding; and an auxiliary winding having a first end connected to the VCC pin through a VCC diode and a second end connected to ground, a voltage divider being connected between the first end of the auxiliary winding and ground to provide a divided voltage to the AUX pin, and the output voltage being regulated by comparing the divided voltage at the AUX pin with a reference voltage inside the PWM controller;

wherein the switching frequency of the PWM controller is a minimum switching frequency when the output voltage has zero loading, the switching frequency is clamped at a maximum switching frequency when the output voltage has loading equal to or greater than a threshold loading selected between 70% to 100% of maximum loading of the output voltage, and the switching frequency is non-decreasing when the output voltage has loading increased from zero to the threshold loading.

2. The flyback convertor as claimed in claim 1, wherein the AC to DC rectification unit is a diode-bridge rectifier or a MOSFET bridge rectifier, the switching unit is a power Metal-Oxide-Semiconductor Field Effect Transistor (MOSFET) or a power Bipolar Junction Transistor (BJT), and the output rectifier is a diode rectifier or a synchronous rectifier.

3. The flyback convertor as claimed in claim 1, wherein the maximum switching frequency, limited in a frequency range between an upper limit and a lower limit, goes down or stays level based on the input voltage sensed by the AUX pin of the PWM controller.

4. The flyback convertor as claimed in claim 1, wherein the maximum switching frequency goes down from 150 to 60 KHz in a range of 90 to 132V AC and from 100 to 50 KHz in a range of 180 to 264V AC.

5. A flyback convertor for converting a universal AC input voltage source into a regulated DC output voltage source to provide an output voltage, comprising:

an AC to DC rectification unit coupled with an input capacitor for rectifying an AC universal input voltage source into an unregulated DC input voltage source to provide an input voltage;

a pulse width modulation (PWM) controller with a programmable switching frequency, having at least a VCC (supply voltage input) pin, a GND (reference ground) pin, a GATE (gate drive output) pin, an AUX (auxiliary input) pin, a CS (current-sensing) pin, and a COMP (compensation) pin;

a flyback transformer having:
a primary winding in a primary side, the primary winding having a first end connected to the input capacitor to receive the input voltage and a second end connected in series with a switching unit and a current sensing resistor, the GATE pin driving the switching unit with a referenced PWM signal, the CS pin being connected to the current sensing resistor and the COMP pin being connected to ground through a compensation capacitor;

a secondary winding in a secondary side, the secondary winding having a first end connected to an output rectifier which outputs an output voltage, an output capacitor being connected between the output rectifier and a second end of the secondary winding; and an auxiliary winding having a first end connected to the VCC pin through a VCC diode and a second end connected to ground, a first voltage divider being connected between the first end of the auxiliary winding and ground to provide a divided voltage to the AUX pin; and a secondary side regulator on the secondary side, the secondary side regulator including a current limiting resistor connected to the output voltage, an opto-coupler and a shunt regulator connected in series with the current limiting resistor, and a second voltage divider connected to the output voltage, the output voltage being regulated by comparing a scaled down voltage of the second voltage divider with a reference voltage inside the shunt regulator, and the opto-coupler opto-coupling the secondary side regulator to the COMP pin;

wherein the switching frequency of the PWM controller is a minimum switching frequency when the output voltage has zero loading, the switching frequency is clamped at a maximum switching frequency when the output voltage has loading equal to or greater than a threshold loading selected between 70% to 100% of maximum loading of the output voltage, and the switching frequency is non-decreasing when the output voltage has loading increased from zero to the threshold loading.

6. The flyback convertor as claimed in claim 5, wherein the AC to DC rectification unit is a diode-bridge rectifier or a MOSFET bridge rectifier, the switching unit is a power Metal-Oxide-Semiconductor Field Effect Transistor (MOSFET) or a power Bipolar Junction Transistor (BJT), and the output rectifier is a diode rectifier or a synchronous rectifier.

7. The flyback convertor as claimed in claim 5, wherein the maximum switching frequency, limited in a frequency range between an upper limit and a lower limit, goes down or stays level based on the input voltage sensed by the AUX pin of the PWM controller.

8. The flyback convertor as claimed in claim 5, wherein the maximum switching frequency goes down from 150 to 60 KHz in a range of 90 to 132V AC and from 100 to 50 KHz in a range of 180 to 264V AC.

* * * * *